United States Patent
Fukuyo et al.

(10) Patent No.: US 12,541,359 B2
(45) Date of Patent: Feb. 3, 2026

(54) SERVER, VEHICLE, AND SOFTWARE MANAGEMENT METHOD

(71) Applicant: TOYOTA JIDOSHA KABUSHIKI KAISHA, Toyota (JP)

(72) Inventors: Satoru Fukuyo, Nisshin (JP); Takuya Kawasaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 18/484,025

(22) Filed: Oct. 10, 2023

(65) Prior Publication Data

US 2024/0201977 A1    Jun. 20, 2024

(30) Foreign Application Priority Data

Dec. 20, 2022  (JP) .................. 2022-203417

(51) Int. Cl.
   *G06F 8/65*    (2018.01)
   *G07C 5/00*    (2006.01)

(52) U.S. Cl.
   CPC ............ *G06F 8/65* (2013.01); *G07C 5/008* (2013.01)

(58) Field of Classification Search
   CPC ......... G06F 8/65; G07C 5/008; H04L 9/3247; H04L 9/0643; H04L 9/0866
   See application file for complete search history.

(56) References Cited

U.S. PATENT DOCUMENTS

| | | | |
|---|---|---|---|
| 2020/0023862 A1 | 1/2020 | Rodriguez Bravo et al. | |
| 2020/0050442 A1* | 2/2020 | Sakurai | H04W 4/48 |
| 2020/0076805 A1 | 3/2020 | Koike et al. | |
| 2021/0326770 A1* | 10/2021 | Mendes | G06F 21/32 |
| 2023/0353373 A1* | 11/2023 | Bruso | H04L 9/3247 |

FOREIGN PATENT DOCUMENTS

| | | | | |
|---|---|---|---|---|
| CN | 102549592 A | * | 7/2012 | ............ G06F 21/57 |
| JP | 2017-149323 A | | 8/2017 | |
| JP | 2020-035202 A | | 3/2020 | |

OTHER PUBLICATIONS

Vishnu Mallikalava; Theft Vehicle Detection Using Image Processing integrated Digital Signature Based ECU; IEEE; pp. 913-918; retrieved on Jun. 26, 2025 (Year: 2020).*

Hirabayashi, Translated CN 102549592 A (Year: 2012).*

* cited by examiner

*Primary Examiner* — S. Sough
*Assistant Examiner* — Cuong V Luu
(74) *Attorney, Agent, or Firm* — Oliff PLC

(57) ABSTRACT

A server is configured to manage software for an electronic control unit mounted on a vehicle. The server includes: one or more memories that store flag data for switching between an activated state and a deactivated state of a specific function that is executable by the software; and one or more processors configured to generate an electronic signature to be added to the flag data. The one or more processors are configured to calculate a hash value from the flag data and dummy data that are not used to switch between the activated state and the deactivated state of the specific function, and generate the electronic signature using the calculated hash value.

10 Claims, 10 Drawing Sheets

FIG. 2
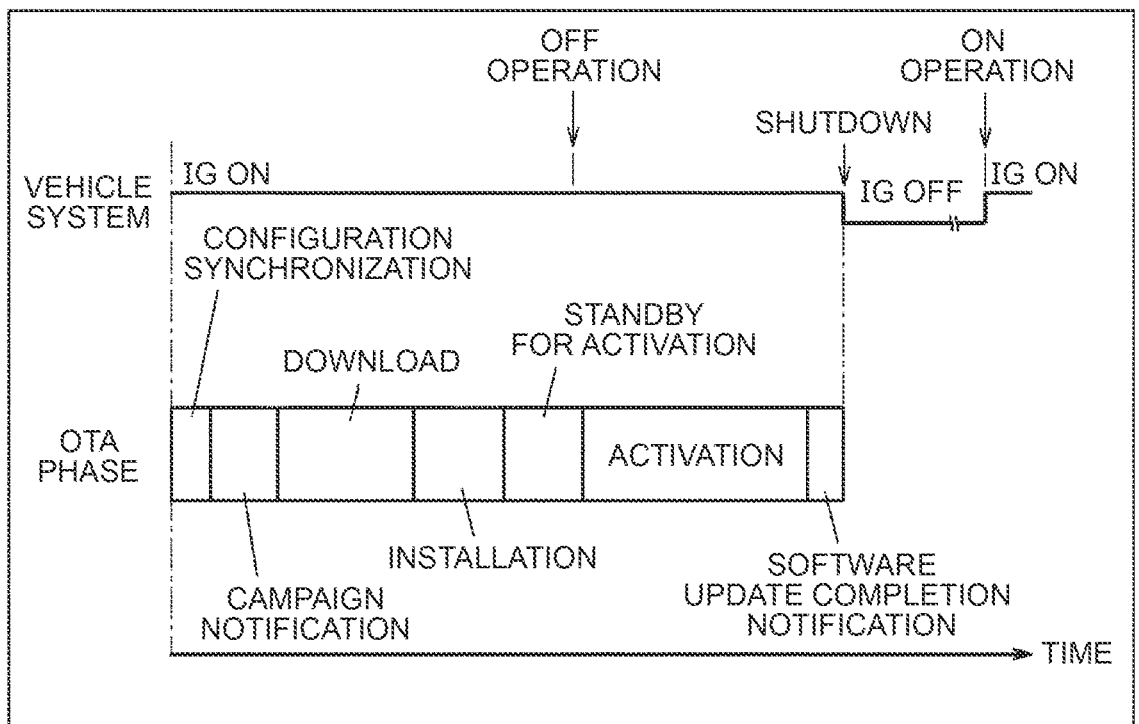
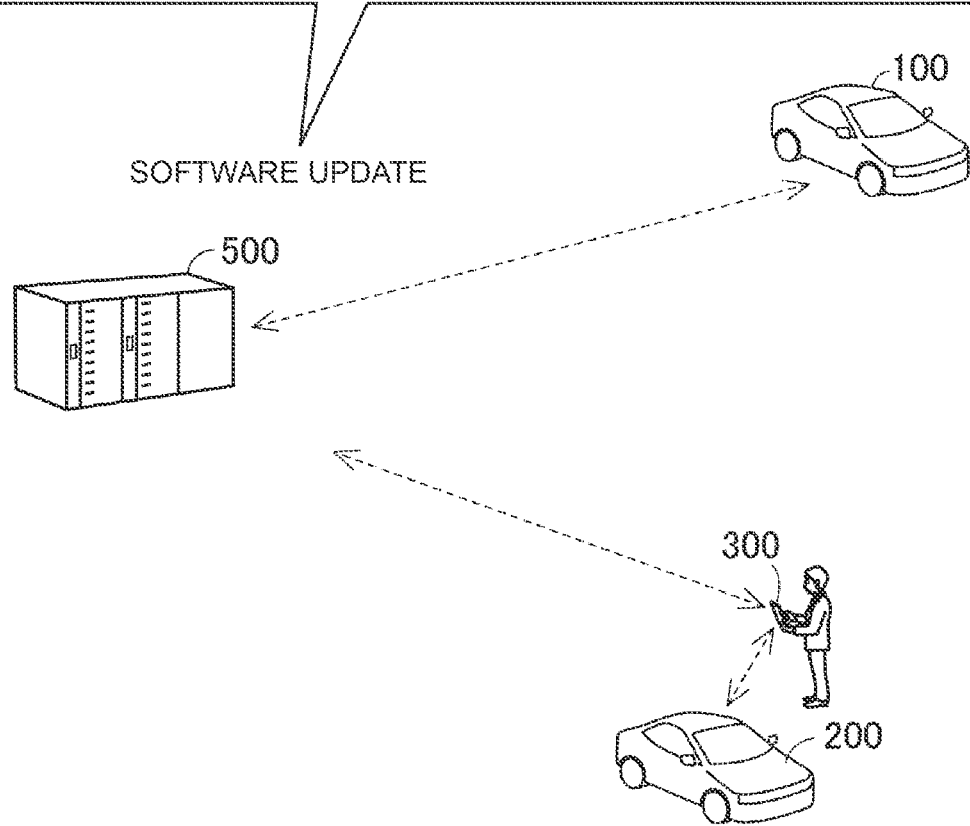

FIG. 4

| COMMAND ID | MESSAGE ID | | | REQUEST ID | DATA LENGTH | SERVICE ID | APPLICATION ID | | DATA ID | | NUMBER OF DIAGNOSTIC FRAMES | SIGNATURE SIZE COMMAND NUMBER | |
|---|---|---|---|---|---|---|---|---|---|---|---|---|---|
| 90 | 01 | | | ** | ** | FF | 70 | 2E | 00 | 2A | 00 | 00 | 01 | REQUEST FRAME |
| 07 | 50 | 6D | ** | 1F | 01 | 02 | 01 | 00 | ** | ** | ** | ** | DIAGNOSTIC FRAME 1 |
| 07 | 50 | 6D | 21 | ** | ** | ** | ** | ** | ** | ** | ** | ** | DIAGNOSTIC FRAME 2 |
| 07 | 50 | 6D | 22 | ** | ** | ** | ** | ** | ** | ** | ** | ** | DIAGNOSTIC FRAME 3 |
| 07 | 50 | 6D | 23 | ** | ** | ** | ** | ** | ** | ** | ** | ** | DIAGNOSTIC FRAME 4 |
| 07 | 50 | 6D | 24 | ** | ** | ** | ** | ** | ** | ** | ** | ** | |
| 07 | 50 | 6D | 25 | ** | ** | ** | ** | ** | ** | ** | ** | ** | |
| 07 | 50 | 6D | 26 | ** | ** | ** | ** | ** | ** | ** | ** | ** | DUMMY DATA Ddm |
| 07 | 50 | 6D | 27 | ** | ** | ** | ** | ** | ** | ** | ** | ** | |
| ... | ... | ... | ... | ... | ... | ... | ... | ... | ... | ... | ... | ... | |
| 07 | 50 | 6D | 2* | ** | ** | ** | ** | ** | ** | ** | ** | ** | DIAGNOSTIC FRAME 43 |
| | CAN ID | | N_TA FRAME NUMBER | | | | NONCE | | FLAG DATA DfI | | | ELECTRONIC SIGNATURE Esg | |

SERVER, VEHICLE, AND SOFTWARE MANAGEMENT METHOD

CROSS-REFERENCE TO RELATED APPLICATION

This application claims priority to Japanese Patent Application No. 2022-203417 filed on Dec. 20, 2022, incorporated herein by reference in its entirety.

BACKGROUND

1. Technical Field

The present disclosure relates to a server, a vehicle, and a software management method.

2. Description of Related Art

Over-The-Air (OTA) technologies for updating software (vehicle control program) stored in a vehicle control device (electronic control unit (ECU)) through wireless communication have been studied and developed. For example, Japanese Unexamined Patent Application Publication No. 2017-149323 (JP 2017-149323 A) discloses a vehicle control system capable of suitably updating software without impairing user convenience. When it is determined that an electronic key of a vehicle is located inside the vehicle, a portable device transmits a signal requesting download of update software to a server. An ECU downloads the update software transmitted from the server by way of the portable device, and updates the software.

SUMMARY

In a system that enables software for an in-vehicle ECU to be updated by the OTA, a server can transmit an instruction (e.g. flag data) for switching between an activated state and a deactivated state of a specific function that is executable by software for the in-vehicle ECU to switch between the activated state and the deactivated state of the specific function. Unauthorized switching of the specific function can be suppressed by applying an electronic signature scheme to the instruction (flag data). It is conceivable to improve security strength using the electronic signature.

The present disclosure improves security strength when switching between an activated state and a deactivated state of a specific function that is executable by software for an in-vehicle ECU is made in accordance with an instruction distributed from a server.

A first aspect of the present disclosure provides a server configured to manage software for an electronic control unit (ECU) mounted on a vehicle. The server includes: a storage unit that stores flag data for switching between an activated state and a deactivated state of a specific function that is executable by the software; and a processing unit configured to generate an electronic signature to be added to the flag data. The processing unit is configured to: calculate a hash value from the flag data and dummy data that are not used to switch between the activated state and the deactivated state of the specific function; and generate the electronic signature using the calculated hash value.

A second aspect of the present disclosure provides a vehicle including an ECU and a communication unit configured to communicate with a server. The ECU includes a storage unit that stores software capable of executing a specific function, and a control unit configured to execute the software. The control unit is configured to calculate a hash value from flag data for switching between an activated state and a deactivated state of the specific function and dummy data that are not used to switch between the activated state and the deactivated state of the specific function when the flag data are received from the server, and switch between the activated state and the deactivated state of the specific function when it is determined based on the calculated hash value that the flag data have not been tampered with.

A third aspect of the present disclosure provides a software management method of managing an ECU mounted on a vehicle. The software management method includes: calculating a hash value from flag data for switching between an activated state and a deactivated state of a specific function that is executable by software and dummy data that are not used to switch between the activated state and the deactivated state of the specific function; preparing an electronic signature using the calculated hash value; transmitting the flag data and the electronic signature to the vehicle; comparing the hash value calculated from the flag data and the dummy data received by the vehicle and the hash value of the electronic signature received by the vehicle to determine whether the flag data received by the vehicle have been tampered with; and switching between the activated state and the deactivated state of the specific function on condition that the flag data received by the vehicle have not been tampered with.

With the present disclosure, it is possible to improve security strength when switching between an activated state and a deactivated state of a specific function that is executable by software for an in-vehicle ECU is made in accordance with an instruction (flag data) distributed from a server.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 illustrates an overview of a software update method that uses an OTA technology;

FIG. 4 illustrates an example of the data structure of data transmitted from the OTA center (flag data distribution unit) to a vehicle;

DETAILED DESCRIPTION OF EMBODIMENTS

An embodiment of the present disclosure will be described in detail below with reference to the drawings.

The same or corresponding parts are denoted by the same signs throughout the drawings, and description thereof will not be repeated.

Figure 1:
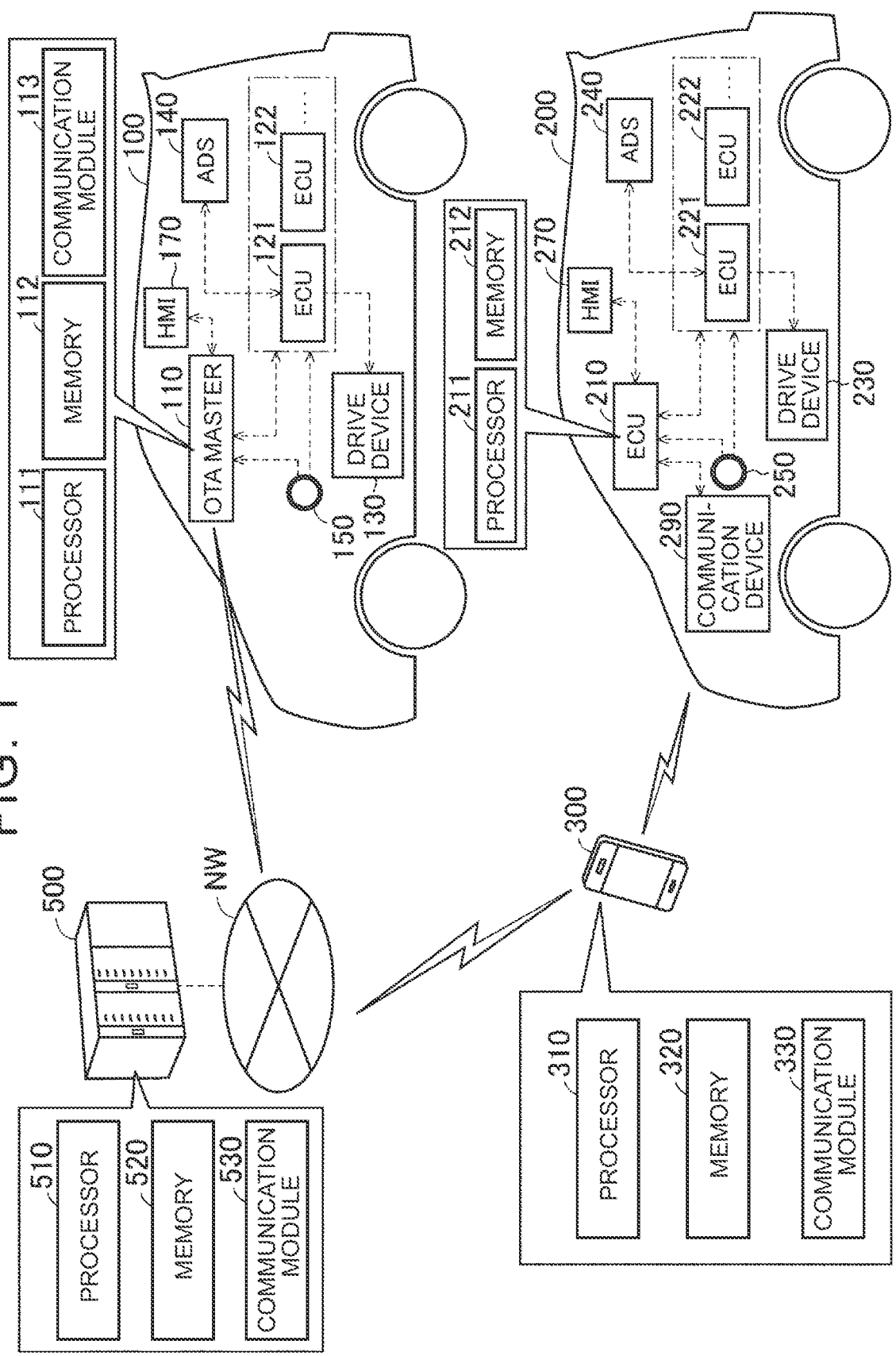
FIG. 1 illustrates a schematic configuration of a software management system according to an embodiment of the present disclosure.

FIG. 1 illustrates a schematic configuration of a software management system according to an embodiment of the present disclosure. The software management system includes a vehicle 100, a vehicle 200, a user terminal 300, and an OTA center 500. The term "OTA" is an abbreviation of "Over The Air". The OTA center 500 corresponds to an example of the "server" according to the present disclosure.

The vehicles 100 and 200 are each a battery electric vehicle (BEV) that does not include an internal combustion engine, for example. The vehicle 100 supports an OTA access function (a function of wirelessly communicating directly with the OTA center 500). The vehicle 200 does not support the OTA access function. The vehicle 100 can wirelessly communicate directly with the OTA center 500. The vehicle 200 cannot communicate with the OTA center 500 without using a different communication device (i.e. a communication device that is not a communication device of the vehicle 200 itself). The vehicle 200 wirelessly communicates with the OTA center 500 via the user terminal 300 (by way of the user terminal 300).

The user terminal 300 is configured to be carried by a user. The user terminal 300 is a mobile terminal carried and operated by a user (vehicle manager) of the vehicle 200. In this embodiment, a smartphone with a touch panel display (display unit) is used as the user terminal 300. The smartphone includes a built-in computer, and has a speaker function. However, the user terminal is not limited to this, and any terminal that can be carried by the user of the vehicle 200 can be used as the user terminal 300. For example, a laptop computer, a tablet terminal, a portable gaming device, a wearable device (such as a smartwatch, smartglasses, and smartgloves), etc. can also be used as the user terminal 300.

The user terminal 300 includes a processor 310, a memory 320, and a communication module 330. The processor 310 includes a central processing unit (CPU), for example. The memory 320 includes a non-volatile memory such as a flash memory, for example. The communication module 330 includes a communication interface (I/F) for wirelessly communicating directly with the OTA center 500. The communication module 330 also includes a communication I/F for wirelessly communicating directly with the vehicle 200. This enables the vehicle 200 and the OTA center 500 to exchange data by way of the user terminal 300. For example, data can be exchanged (communicated) between the vehicle 200 (ECU 210) and the OTA center 500 by way of the user terminal 300 by the user terminal 300 accessing a communication network NW by specifying the address of the OTA center 500 in response to a request from the vehicle 200.

Application software (hereinafter referred to as a "mobile app") that allows use of a service provided by the OTA center 500 is installed in the user terminal 300. The mobile app allows identification information (terminal identifier (ID)) on the user terminal 300 to be registered in the OTA center 500 in connection with identification information (vehicle ID) on the vehicle 200. The user terminal 300 can exchange information with the OTA center 500 through the mobile app. The user terminal 300 also functions as an input device and a display device.

The OTA center 500 is a server that provides a vehicle software update service by the OTA technology. The OTA center 500 is configured to perform in-vehicle ECU software update remotely from the center by way of a communication section. The OTA center 500 distributes software for the in-vehicle ECU. The term "ECU" means an electronic control unit.

The OTA center 500 includes a processor 510, a memory 520, and a communication module 530. The processor 510 includes a CPU, for example. The memory 520 includes a non-volatile memory such as a flash memory, for example. The communication module 530 is connected to the communication network NW through a wire, and communicates with each of a plurality of vehicles (including the vehicle 100) and a plurality of mobile terminals (including the user terminal 300) via the communication network NW. The communication network NW is a wide area network built by the Internet and wireless base stations, for example. The communication network NW may include a cellular telephone network.

The vehicle 100 includes an OTA master 110 and a plurality of ECUs (including ECUs 121, 122, etc.). The vehicle 200 includes a plurality of ECUs (including ECUs 210, 221, 222, etc.). The OTA master 110 includes a built-in computer, and functions as an in-vehicle diagnosis device. Each vehicle may include any number of ECUs (in-vehicle ECUs). Each in-vehicle ECU includes a built-in computer that includes at least one processor and at least one memory. Each in-vehicle ECU may include a plurality of microcomputers in the form of a main microcomputer and a sub microcomputer.

In the vehicle 100, the OTA master 110 and the ECUs (in-vehicle ECUs) are connected to each other via a communication bus, and configured to be communicable with each other through a wire. In the vehicle 200, the ECUs are connected to each other via a communication bus, and configured to be communicable with each other through a wire. The method of communication between control devices in each vehicle is not specifically limited, and a Controller Area Network (CAN) or an Ethernet (registered trademark) may be used, for example.

The OTA master 110 includes a processor 111, a memory 112, and a communication module 113. The processor 111 includes a CPU, for example. The memory 112 includes a non-volatile memory such as a flash memory, for example. The communication module 113 includes a communication interface (I/F) for wirelessly communicating directly with the OTA center 500. For example, wireless communication between the vehicle 100 (communication module 113) and the OTA center 500 is established by the communication module 113 accessing the communication network NW by specifying the address of the OTA center 500. The communication module 113 may include a telematics control unit (TCU) and/or a data communication module (DCM) that performs wireless communication.

In the vehicle 200, the ECU 210 includes a processor 211 and a memory 212. The processor 211 includes a CPU, for example. The memory 212 includes a non-volatile memory such as a flash memory, for example. The vehicle 200 further includes a communication device 290. The ECU 210 communicates with devices outside the vehicle through the communication device 290. The communication device 290 includes a communication interface (I/F) for wirelessly communicating directly with the user terminal 300. The communication device 290 and the user terminal 300 may perform short-range communication such as a wireless local area network (LAN), near field communication (NFC), or Bluetooth (registered trademark). The communication device 290 may communicate directly with the user terminal 300 that is located in the vehicle or in a range around the vehicle. Information may be exchanged via the communication device 290 between the user terminal 300 inside or outside the vehicle and the ECU 210 while the vehicle 200 is stationary. Meanwhile, information may be exchanged via the communication device 290 between the user terminal 300 inside the vehicle and the ECU 210 while the vehicle 200 is traveling. The ECU 210 can communicate with the OTA center 500 via the user terminal 300 by requesting the user terminal 300 to communicate with the OTA center 500 as discussed earlier.

As described above, each of the OTA master 110 of the vehicle 100 and the ECU 210 of the vehicle 200 is configured to be wirelessly communicable with the OTA center 500. Each of the vehicles 100 and 200 can communicate with the OTA center 500 both while the vehicle is stationary and while the vehicle is traveling. Each of the OTA master 110 and the ECU 210 manages in-vehicle information, receives a campaign, and manages a software update sequence. Hereinafter, the OTA master 110 and the ECU 210 will be referred to as "update masters" when not differentiated from each other. The OTA master 110 corresponds to an update master of the vehicle 100, and the ECU 210 corresponds to an update master of the vehicle 200.

The vehicles 100 and 200 are each an autonomous driving vehicle configured to be capable of autonomous driving. The vehicles 100 and 200 are configured to be capable of both manned travel and unmanned travel. While the vehicles 100 and 200 are configured to be capable of unmanned autonomous driving, the vehicles 100 and 200 can also be manually driven by a user (manned travel). The vehicles 100 and 200 are also capable of autonomous driving (e.g. auto cruise control) during manned travel.

The vehicles 100 and 200 include drive devices 130 and 230 and automated driving systems (ADSs) 140 and 240, respectively. In the vehicle 100, the ECU 121 is configured to control the drive device 130. In the vehicle 200, the ECU 221 is configured to control the drive device 230.

The drive devices 130 and 230 each include an accelerator device, a brake device, and a steering device. The accelerator device includes a motor generator (hereinafter referred to as an "MG") that rotates driving wheels of the vehicle, a power control unit (PCU) that drives the MG, and a battery that supplies power for driving the MG to the PCU.

The ADSs 140 and 240 each include a recognition sensor (e.g. at least one of a camera, a millimeter wave radar, and a lidar) that recognizes the external environment of the vehicle, and execute a process related to autonomous driving based on information sequentially acquired by the recognition sensor. The ADSs 140 and 240 generate a travel plan (information indicating the future behavior of the vehicle) that matches the external environment of the vehicle in cooperation with the ECUs 121 and 221, respectively. Then, the ADSs 140 and 240 respectively request the ECUs 121 and 221 to control various actuators included in the drive devices 130 and 230 so as to drive the vehicles 100 and 200 in accordance with the travel plan.

The vehicles 100 and 200 include start switches 150 and 250 and human machine interface (HMI) devices 170 and 270, respectively.

The start switches 150 and 250 are each a switch for the user to start a vehicle system (a control system for the vehicle 100, 200), and are installed in a vehicle cabin, for example. In general, the start switch is referred to as a "power switch" or an "ignition switch". The vehicle system (including the ECUs mounted on the vehicle) is switched between on (activated) and off (deactivated) when the user operates the start switch 150, 250. Performing an operation to turn on the start switch 150, 250 starts the vehicle system in the deactivated state, and brings the vehicle system to the activated state (hereinafter also referred to as "IG on"). Meanwhile, performing an operation to turn off the start switch 150, 250 when the vehicle system is activated brings the vehicle system to the deactivated state (hereinafter also referred to as "IG off").

The operation to turn on the start switch 150, 250 is an operation to switch the state of the vehicle from IG off to IG on. When the user performs an operation to turn on the start switch 150, 250, a start request is input to each in-vehicle ECU. That is, each in-vehicle ECU receives a start request from the user. On the other hand, the operation to turn off the start switch 150, 250 is an operation to switch the state of the vehicle from IG on to IG off. When the user performs an operation to turn off the start switch 150, 250, a shutdown request is input to each in-vehicle ECU. That is, each in-vehicle ECU receives a shutdown request from the user. However, the operation to turn off the start switch 150, 250 is prohibited while the vehicle is traveling.

The HMI devices 170 and 270 each include an input device and a display device. The HMI devices 170 and 270 may each include a touch panel display that functions as an input device and a display device. The HMI devices 170 and 270 may each include an input device and a display device of a car navigation system. The ECUs 122 and 222 may each be a control device that controls an air-conditioning device and a multimedia function of the vehicles 100 and 200, or may each be a control device that controls other travel devices not controlled by the ECUs 121 and 221.

FIG. 2 illustrates an overview of a software update method that uses the OTA technology. With reference to FIG. 2 in addition to FIG. 1, a process related to software update is performed in a procedure such as configuration synchronization, campaign notification and application acceptance, download, installation, activation, and software update completion notification. The process to be described below is executed by the OTA center 500 and each vehicle (including the vehicles 100 and 200) that receives software distribution from the OTA center 500. The number of vehicles that receive distribution from the OTA center 500 may be about 50, may be 100 or more and less than 1000, or may be 1000 or more. The following description is directed to a case where an ECU to be subjected to software update (hereinafter also referred to as a "target ECU") is constituted from a dual-bank computer.

The vehicle in the IG on state repeatedly executes configuration synchronization each time a time set in advance elapses. The vehicle in the IG on state also executes configuration synchronization when a request for configuration synchronization is received from the OTA center 500. The process of configuration synchronization by the vehicle includes transmitting vehicle configuration information to the OTA center 500. The vehicle configuration information includes hardware information (information indicating product numbers of hardware, identifiers of the ECUs, etc.) and software information (information indicating product numbers of software etc.) for each of the ECUs included in the vehicle, for example.

When the vehicle configuration information is received from the vehicle, the OTA center 500 checks a campaign (software update) that is currently run. When there is any campaign that is applicable to the vehicle, the OTA center 500 transmits an acceptance request signal that requests the user of the vehicle to accept download of new software (updated version of software) related to the campaign. The acceptance request signal includes information (campaign information) about the campaign. The campaign information may include at least one of campaign attribute information (information indicating the purpose of the software update, the function of the vehicle that may be affected by the update, etc.), a list of vehicles as targets for the campaign, information (e.g. software information before and after the update) about ECUs as targets for the campaign, and information about a notification to be sent to the user before and after the update, for example. The campaign indicated by the notification may be a newly run campaign, or may be a campaign that was not applied previously. Hereinafter, transmission of the acceptance request signal will also be referred to as "campaign notification".

When the vehicle receives a campaign notification (acceptance request signal), the vehicle requests the user to input whether to accept application of the campaign. For example, the vehicle requests the user to make an input indicating one of "accept" and "reject" by causing the HMI (the HMI device 170, 270 or the user terminal 300) to display a message such as "New software has been found. Would you like to apply it to this vehicle?". When an input indicating "accept" is made, the vehicle executes a process related to download to be described below. When an input indicating "decline" is made, on the other hand, the vehicle does not execute a process related to download. In this case, the OTA center 500 ends the process related to software update without proceeding to a download phase.

In this embodiment, the OTA center 500 and the update master (e.g. the OTA master 110 or the ECU 210) of the vehicle execute a process related to download in the procedure to be described below.

The update master of the vehicle requests the OTA center 500 for a distribution package including the new software. Then, the update master downloads (receives and saves) the distribution package from the OTA center 500. The distribution package may include, in addition to the new software (e.g. a set of update data for each of the ECUs as targets for the campaign), package attribute information (information indicating the update section, the number of update data in the distribution package, the order of installation for the ECUs, etc.), and update data attribute information (such as identifiers of the target ECUs and verification data for verifying the correctness of the update data). A plurality of target ECUs may be provided in the vehicle 100, 200.

The distribution package is saved in a storage device (e.g. the memory 112 or 212) of the update master through the process related to download discussed above. After the completion of the download, the update master verifies the authenticity of the downloaded distribution package. When the verification result is "normal", the update master notifies the OTA center 500 of the software update state (completion of download). When this notification is made, it is meant that the download has been successfully performed.

When the download is successfully performed, the vehicle executes installation. The update master requests at least one target ECU (e.g. the ECU 121 or 221) to output the state of the target ECU and a diagnostic trouble code (DTC). The update master determines whether installation can be executed for each target ECU based on the state of the target ECU and the DTC. Then, the update master requests the user to make an input indicating one of "accept" and "decline" by causing the HMI to display a predetermined message. When an input indicating "accept" is made, the update master transfers the new software (update data) to the target ECU for which installation can be executed. When the update data are received, the target ECU executes installation (writing into the non-volatile memory) of the update data.

When the transfer of the update data from the update master to the target ECU is completed, the target ECU transmits a transfer completion notification to the update master. When the transfer completion notification is received, the update master requests the target ECU for integrity verification. When this request is received, the target ECU performs verification using integrity verification data (verification data), and transmits the verification result to the update master. The update master saves the verification result (completion/failure/cancellation of installation) for each target ECU. When the integrity verification is completed for all the target ECUs and the verification result is "normal" for all the target ECUs, the update master notifies the OTA center 500 of the software update state (completion of installation). When this notification is made, it is meant that the installation has been successfully performed.

When the installation is successfully performed in succession to the download, the vehicle stands by for activation. After that, when an operation to turn off the start switch (e.g. the start switch 150 or 250) of the vehicle is performed, the update master requests the user to make an input indicating one of "accept" and "decline" by causing the HMI to display a predetermined message. When an input indicating "accept" is made, the update master executes activation (activation of the installed software). When the update master fails in the activation, the update master requests the OTA center 500 for a rollback of the software. When a request for a rollback is received from the vehicle, the OTA center 500 distributes software for a rollback to the vehicle. This allows the update master to return (roll back) the software that could not be activated to the original version using the software for a rollback. When the user makes an input indicating "decline", meanwhile, the update master stops the process related to software update without executing the activation, and shuts down the vehicle system.

When the update master succeeds in the activation, the update master causes the HMI to display the result of the software update. After that, the update master notifies the OTA center 500 of the software update state (completion of software update). When this notification is made, it is meant that the OTA software update has been successfully performed. When this notification is made, the control system for the vehicle is shut down, and switched to IG off. After that, when an operation to turn on the start switch of the vehicle is performed, the vehicle system is switched to IG on. This allows the update program (software of the new version) to be started in the target ECU. The software to be updated is not limited to a control program for a driving assist system such as the autonomous driving control program discussed above, and may be any software.

The software management system according to the present embodiment distributes flag data to an in-vehicle ECU in addition to update software for updating software. The flag data are software for switching between an activated state and a deactivated state of a specific function of software stored in a corresponding ECU, among a plurality of ECUs. The specific function is typically a vehicle control function, and may be a driving assist function (such as an autonomous driving function), for example. However, the specific function is not limited to a specific type, and may be a function not related to vehicle control such as an air-conditioning device or a multimedia function.

Figure 3:
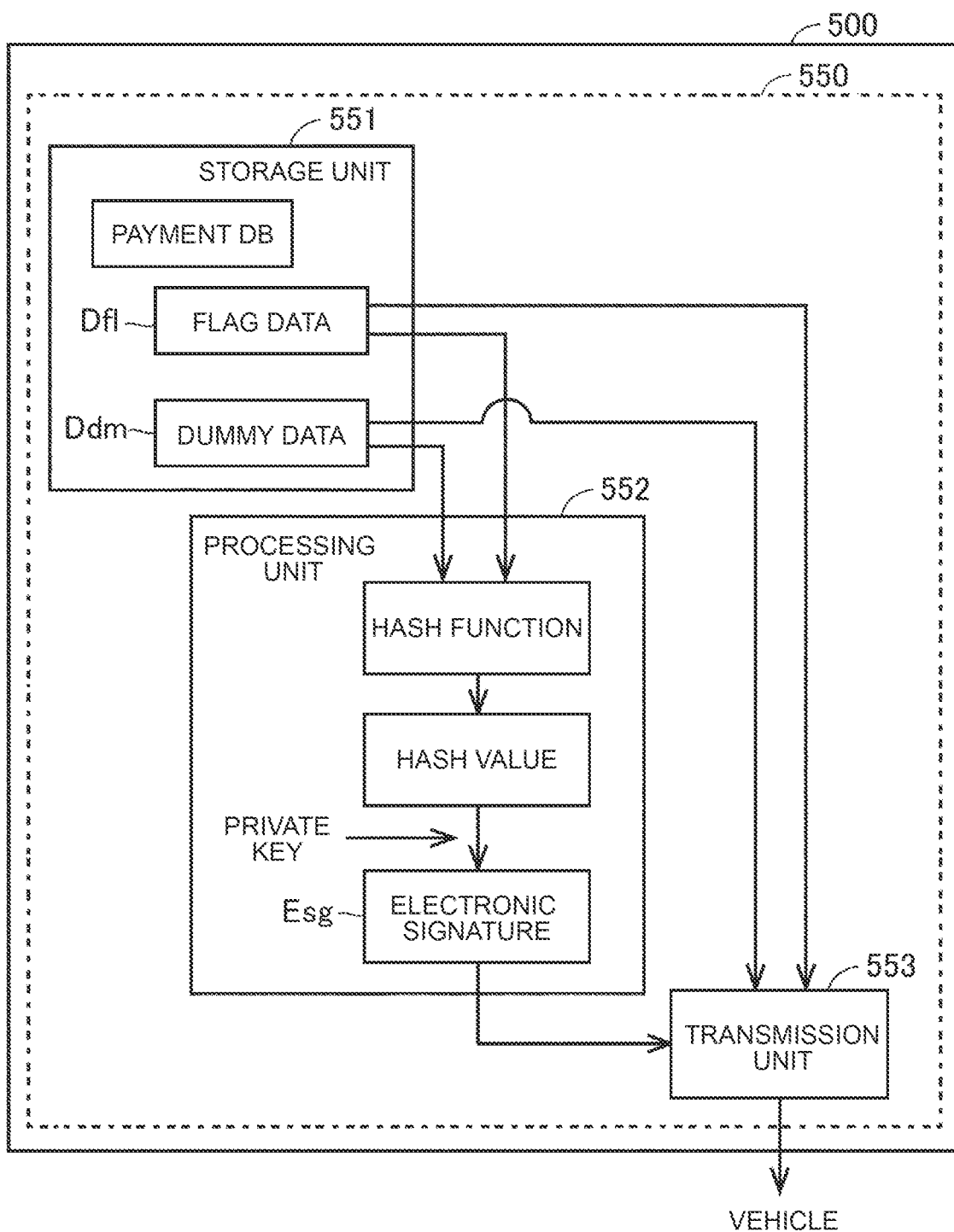
FIG. 3 illustrates an example of functional blocks of a flag data distribution unit constituted in an OTA center.

FIG. 3 illustrates an example of functional blocks of a flag data distribution unit constituted in the OTA center 500. The functional blocks may be functional blocks constituted from the processor 510, the memory 520, the communication module 530, etc., composed of software and hardware, and implemented by one or more processors executing a program stored in one or more memories.

With reference to FIG. 3, a flag data distribution unit 550 of the OTA center 500 includes a storage unit 551, a processing unit 552, and a transmission unit 553. The storage unit 551 stores flag data Dfl, a payment database (payment DB) for managing payment information for the flag data Dfl, and dummy data Ddm. The processing unit 552 calculates a hash value through a hash function calculation procedure using the flag data Dfl and the dummy data Ddm stored in the storage unit 551. The calculated hash value is encrypted using a private key to generate an electronic signature Esg.

The transmission unit 553 transmits the electronic signature Esg generated by the processing unit 552 and the flag data Dfl and the dummy data Ddm that were used to generate the electronic signature Esg to the vehicle 100, 200.

FIG. 4 illustrates an example of the data structure of data transmitted from the OTA center 500 (flag data distribution unit 550) to the vehicle 100, 200. In the present embodiment, as illustrated in FIG. 4, the data structure is composed of a request frame (request message) and 43 diagnostic frames. In the present embodiment, it is assumed that the data are transmitted from the update master (OTA master 110, ECU 210) to the target ECU (the ECU for which switching between the activated state and the deactivated state of the specific function is made in accordance with the flag data) through CAN communication. In FIG. 4, N_TA indicates a transmission destination address (network target address). In FIG. 4, the dummy data Ddm indicated by a shaded area are added to the flag data Dfl, and arranged such that a nonce is followed by the flag data Dfl and the dummy data Ddm. In addition, the electronic signature Esg is arranged after the dummy data Ddm. The flag data Dfl are instruction data to activate the specific function of the software when the user makes a payment for the specific function (payment of a use fee). In the present embodiment, the data length (data size) of the flag data Dfl may be 8 bytes. The dummy data Ddm may be a vehicle identification number (VIN) of a vehicle on which the target ECU is mounted, identification information on the target ECU, management information on the target ECU (manufacturer identification number of the target ECU), a product number (version) of the software (program), a fixed value, etc. The data length of the dummy data Ddm may be 8 bytes.

Figure 5:
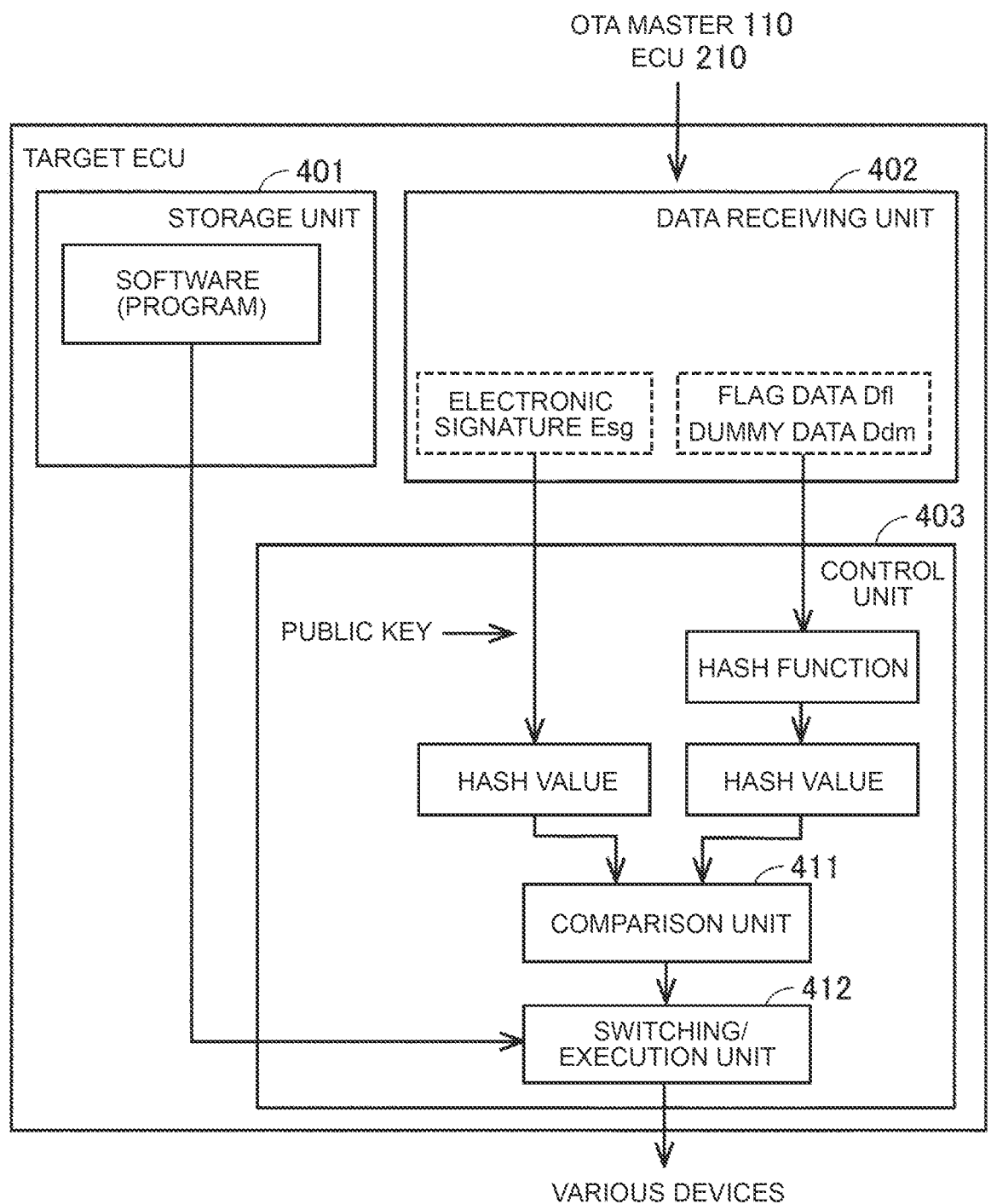
FIG. 5 illustrates a part of functional blocks constituted in a target ECU.

FIG. 5 illustrates a part of functional blocks constituted in the target ECU (e.g. the ECU 121, 122, 221, 222). The functional blocks may be functional blocks constituted from the processor, the memory, etc. of the target ECU, composed of software and hardware, and implemented by one or more processors executing a program stored in one or more memories.

With reference to FIG. 5, a storage unit 401 of the target ECU (e.g. the ECU 121, 122, 221, 222) stores software (program) capable of executing the specific function. The software may be software that can be updated using the OTA technology discussed above. A data receiving unit 402 receives data (data indicated in FIG. 4) including the flag data Dfl, distributed from the OTA center 500, through CAN communication by way of the update master. For example, the target ECU corresponding to CAN_ID and N_TA indicated in FIG. 4 receives data distributed from the OTA center 500 through CAN communication by way of the update master.

A control unit 403 obtains a hash value by decrypting the electronic signature Esg received by the data receiving unit 402 using a public key. The control unit 403 also calculates a hash value through a hash function calculation procedure using the flag data Dfl and the dummy data Ddm received by the data receiving unit 402. A comparison unit (verification unit) 411 of the control unit 403 compares the hash value obtained from the electronic signature Esg and the hash value obtained from the flag data Dfl and the dummy data Ddm, and determines that the received flag data Dfl have not been tampered with (are authentic) when the hash values coincide with each other. A switching/execution unit 412 of the control unit 403 activates the specific function of the software (software capable of executing the specific function) stored in the storage unit 401 when the comparison unit 411 determines that the received flag data Dfl are authentic (determines that the received flag data Dfl have not been tampered with). Consequently, the control unit 403 executes a process according to the software (program) together with the activated specific function. When the comparison unit 411 determines that the hash values do not coincide with each other, the specific function is deactivated (maintained in the deactivated state) by the switching/execution unit 412, and the control unit 403 executes a process according to the software without implementing the specific function.

Figure 6:
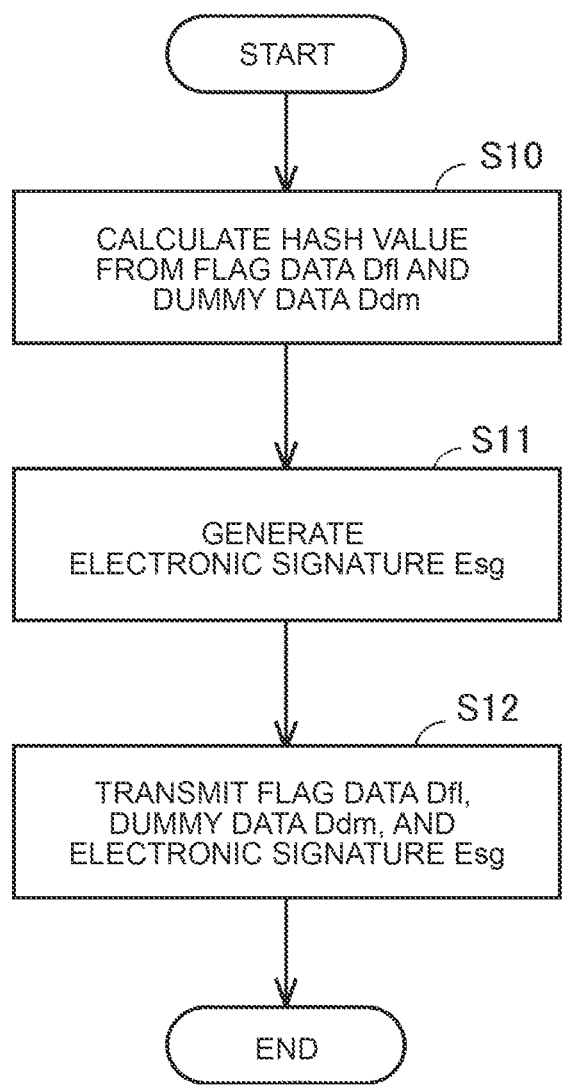
FIG. 6 is a flowchart illustrating an example of a process executed by the flag data distribution unit of the OTA center.

FIG. 6 is a flowchart illustrating an example of a process executed by the flag data distribution unit 550 of the OTA center 500. The process in this flowchart is started when the user makes a payment to activate the specific function of the software stored in the target ECU of the vehicle 100, 200.

For example, when the user makes a payment to upgrade the level of autonomous driving by the ADS 140, 240 from level 3 to level 4, or when the user makes a payment to add a vehicle theft monitoring function that utilizes the recognition sensor of the ADS 140, 240, such information (payment information) is added to the payment DB of the storage unit 551 (see FIG. 3). The present routine is started when new payment information is added to the payment DB. First, in step (hereinafter abbreviated to "S") 10, a hash value is calculated through a hash function calculation procedure using the flag data Dfl and the dummy data Ddm. The flag data Dfl correspond to the software, for which the specific function is to be activated by the payment. The dummy data Ddm may be information on the VIN of a vehicle owned by the user that has made the payment, for example.

Subsequently, in S11, an electronic signature Esg is generated by encrypting the hash value calculated in S10 using a private key. In S12, the electronic signature Esg generated in S11 and the flag data Dfl and the dummy data Ddm that were used to generate the electronic signature Esg are transmitted to the vehicle. The vehicle as the transmission destination is the vehicle owned by the user that has made the payment, and is determined based on the VIN, for example.

When the update master (of the vehicle 100, 200) receives the electronic signature Esg, the flag data Dfl, and the dummy data Ddm distributed from the OTA center 500, such data are downloaded, transferred to the target ECU after the completion of the download, and installed and activated as in the software update method discussed above. In the present embodiment, the authenticity of the flag data Dfl is verified by the target ECU.

Figure 7:
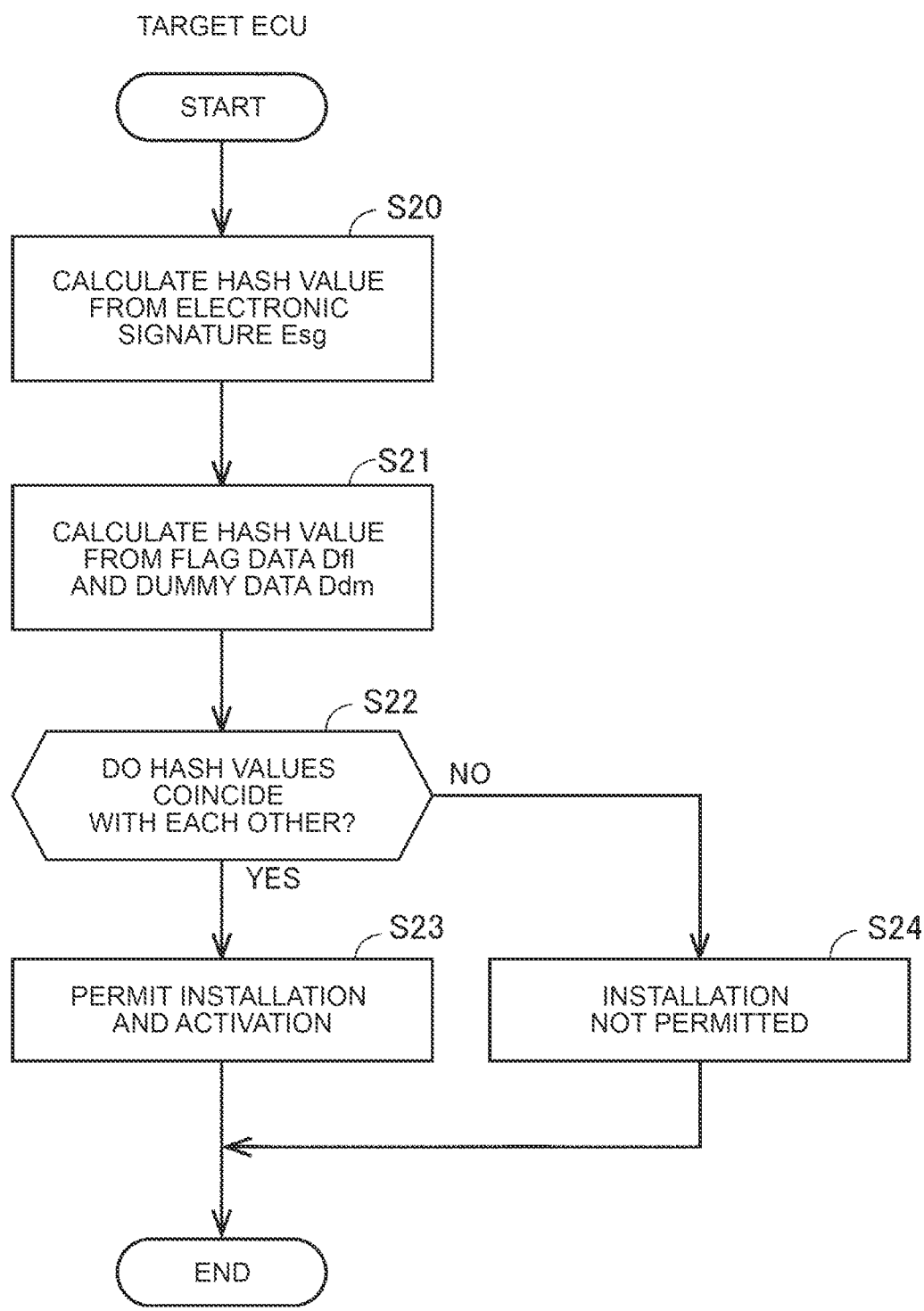
FIG. 7 is a flowchart illustrating an example of a verification process executed by the target ECU.

FIG. 7 is a flowchart illustrating an example of a verification process executed by the target ECU. This flowchart is started when the electronic signature Esg, the flag data Dfl, and the dummy data Ddm are transferred from the update master.

First, in S20, a hash value is obtained by decrypting the electronic signature Esg transferred from the update master using a public key. Subsequently, in S21, a hash value is calculated through a hash function calculation procedure using the flag data Dfl and the dummy data Ddm transferred from the update master.

In S22, it is determined whether the hash value calculated in S20 and the hash value calculated in S21 coincide with each other. When the hash values coincide with each other, a positive determination is made and the process proceeds to S23. When the hash values do not coincide with each other, a negative determination is made and the process proceeds to S24.

In S23, installation and activation of the flag data Dfl are permitted. This allows the specific function of the software to be activated by executing installation and activation of the flag data Dfl. In S24, installation of the flag data Dfl is not permitted. This allows the specific function of the software to be deactivated (maintained in the deactivated state) since the flag data Dfl are not installed.

In the present embodiment, a hash value is calculated from the flag data Dfl for switching between the activated state and the deactivated state of the specific function that is executable by the software and the dummy data Ddm that are not used to switch between the activated state and the deactivated state of the specific function, and an electronic signature Esg is prepared using the calculated hash value. The flag data Dfl and the electronic signature Esg are transmitted to the vehicle 100, 200. In the vehicle 100, 200, a hash value is calculated from the flag data Dfl and the dummy data Ddm, and compared with the hash value of the electronic signature Esg. When the hash value calculated from the flag data Dfl and the dummy data Ddm and the hash value of the electronic signature Esg coincide with each other, it is determined that the flag data Dfl received by the vehicle 100, 200 have not been tampered with, and switching between the activated state and the deactivated state of the specific function is made. Thus, the data length is lengthened (the data size is increased) by an amount corresponding to the dummy data Ddm and the number of patterns of the hash value is increased compared to when a hash value is calculated from the flag data Dfl, improving security strength.

First Modification

When the data length of the flag data Dfl is long (when the data amount is large), the number of patterns of the hash value is increased compared to when the data length is short (when the data amount is small), improving security strength. In a first modification, a hash value is calculated and an electronic signature is prepared without using the dummy data Ddm when the data length of the flag data Dfl is a predetermined length or more.

Figure 8:
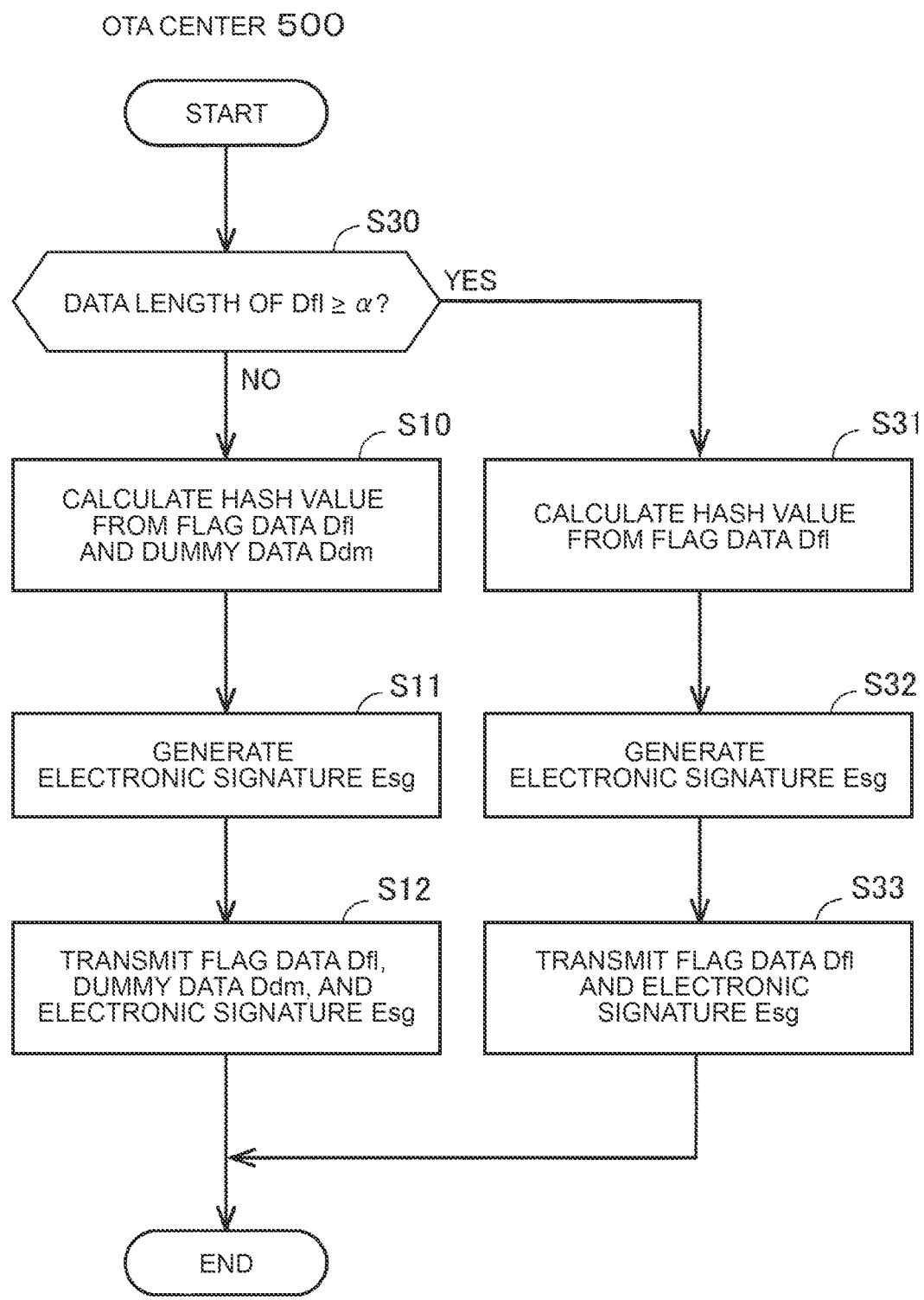
FIG. 8 is a flowchart illustrating an example of a process executed by a flag data distribution unit of an OTA center according to a first modification.

FIG. 8 is a flowchart illustrating an example of a process executed by a flag data distribution unit 550 of an OTA center 500 according to the first modification. The process in this flowchart is started when the user makes a payment to activate the specific function of the software stored in the target ECU of the vehicle 100, 200, as with the flowchart in FIG. 6.

With reference to FIG. 8, in S30, it is determined whether the data length of the flag data Dfl corresponding to the software, for which the specific function is activated by making a payment, is a predetermined length $\alpha$ or more (it is determined whether the data size of the flag data Dfl is a predetermined amount a or more). The flag data Dfl correspond to the software, for which the specific function is to be activated by the payment. The flag data Dfl may include information on time data that indicate the time to switch between the activated state and the deactivated state of the specific function, information on position data that indicate the position (area) to switch between the activated state and the deactivated state of the specific function, etc., in addition to instruction data to activate the specific function when the user makes a payment for the specific function of the software. In this case, the data length of the flag data Dfl is longer than that of the flag data Dfl not including such information. In the first modification, the data length is increased from 8 bytes to 16 bytes, for example. In the first modification, the predetermined length $\alpha$ is set to 9 bytes. When the flag data Dfl includes information such as the time data and the position data, a positive determination is made in S30, and the process proceeds to S31. When the flag data Dfl do not include such information (when the flag data Dfl are 8 bytes of data), a negative determination is made in S30, and the process proceeds to S10. The processes in S10 to S12 are the same as those in the flowchart in FIG. 6, and thus description thereof will be omitted.

In S31, a hash value is calculated from the flag data Dfl through a hash function calculation procedure. Subsequently, in S32, an electronic signature Esg is generated by encrypting the hash value calculated in S31 using a private key. In S33, the electronic signature Esg generated in S32 and the flag data Dfl that were used to generate the electronic signature Esg are transmitted to the vehicle. The vehicle as the transmission destination is the vehicle owned by the user that has made the payment, and is determined based on the VIN.

When the electronic signature Esg, the flag data Dfl, and the dummy data Ddm are distributed from the OTA center 500, the target ECU verifies the authenticity of the flag data Dfl (see FIG. 7) as in the above embodiment.

When the electronic signature Esg and the flag data Dfl are distributed from the OTA center 500, the target ECU verifies the authenticity of the flag data Dfl by determining whether the hash value obtained by decrypting the electronic signature Esg and the hash value calculated using the flag data Dfl coincide with each other. When the flag data Dfl have not been tampered with the hash values coinciding with each other, installation and activation of the flag data Dfl are permitted. When there is a possibility that the flag data Dfl have been tampered with the hash values not coinciding with each other, installation of the flag data Dfl is not permitted.

In the first modification, an electronic signature Esg is generated using a hash value calculated from the flag data Dfl and the dummy data Ddm when the data length of the flag data Dfl is shorter than the predetermined length $\alpha$, and an electronic signature Esg is generated using a hash value calculated from the flag data Dfl without using the dummy data Ddm when the data length of the flag data Dfl is the predetermined length $\alpha$ or more, improving security strength.

Second Modification

In a second modification, the dummy data Ddm are shared in advance between the OTA center 500 and the target ECU so that the dummy data Ddm are not distributed from the OTA center 500 to the target ECU (vehicle 100, 200).

Figure 9:
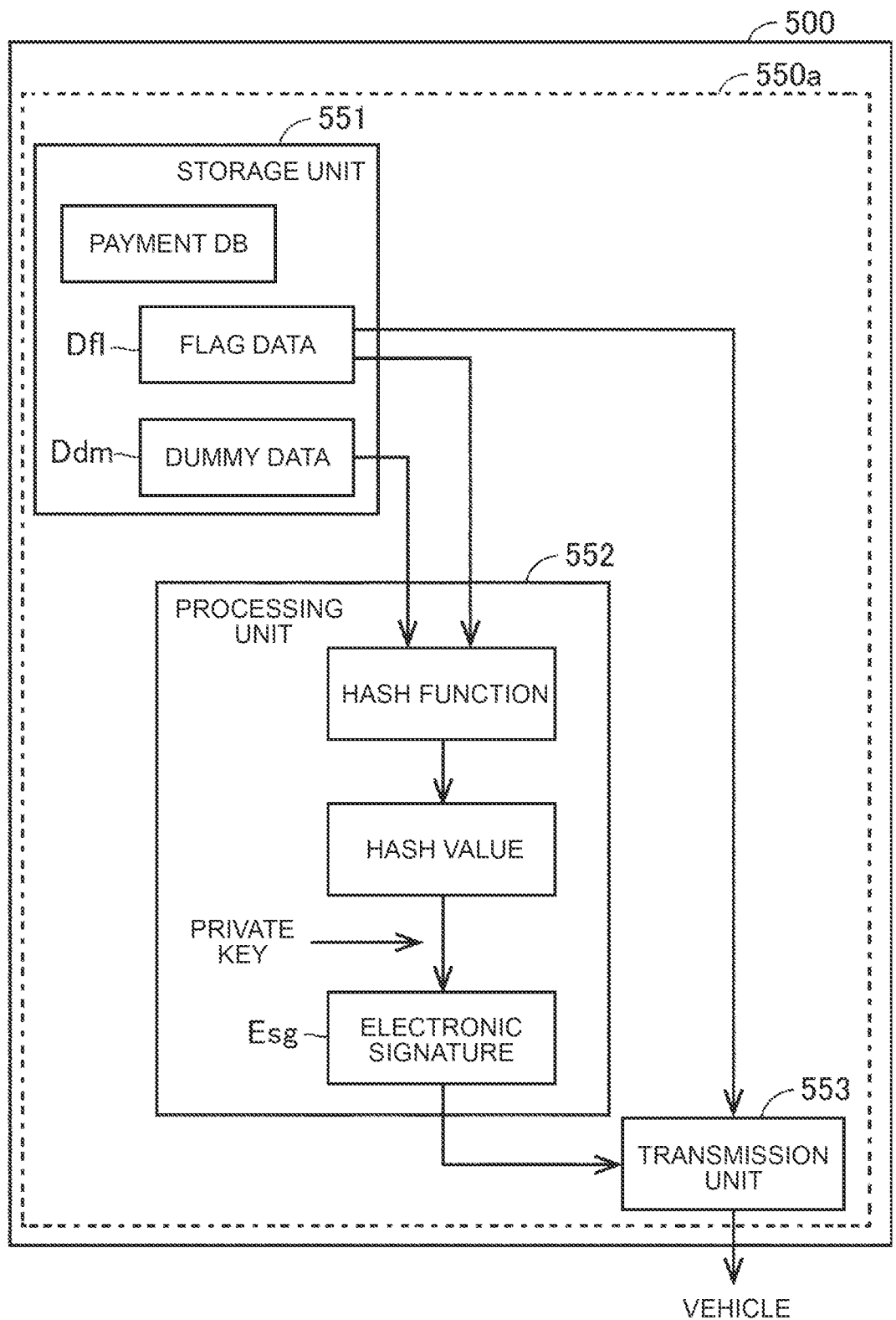
FIG. 9 illustrates an example of functional blocks of a flag data distribution unit constituted in an OTA center according to a second modification.

FIG. 9 illustrates an example of functional blocks of a flag data distribution unit constituted in an OTA center 500 according to a second modification. In a flag data distribution unit 550a according to the second modification, the transmission unit 553 transmits the electronic signature Esg generated by the processing unit 552 and the flag data Dfl to the vehicle 100, 200. While the flag data distribution unit 550 according to the above embodiment transmits the electronic signature Esg generated by the processing unit 552 and the flag data Dfl and the dummy data Ddm that were used to generated the electronic signature Esg to the vehicle 100, 200, the flag data distribution unit 550a does not transmit the dummy data Ddm to the vehicle 100, 200.

Figure 10:
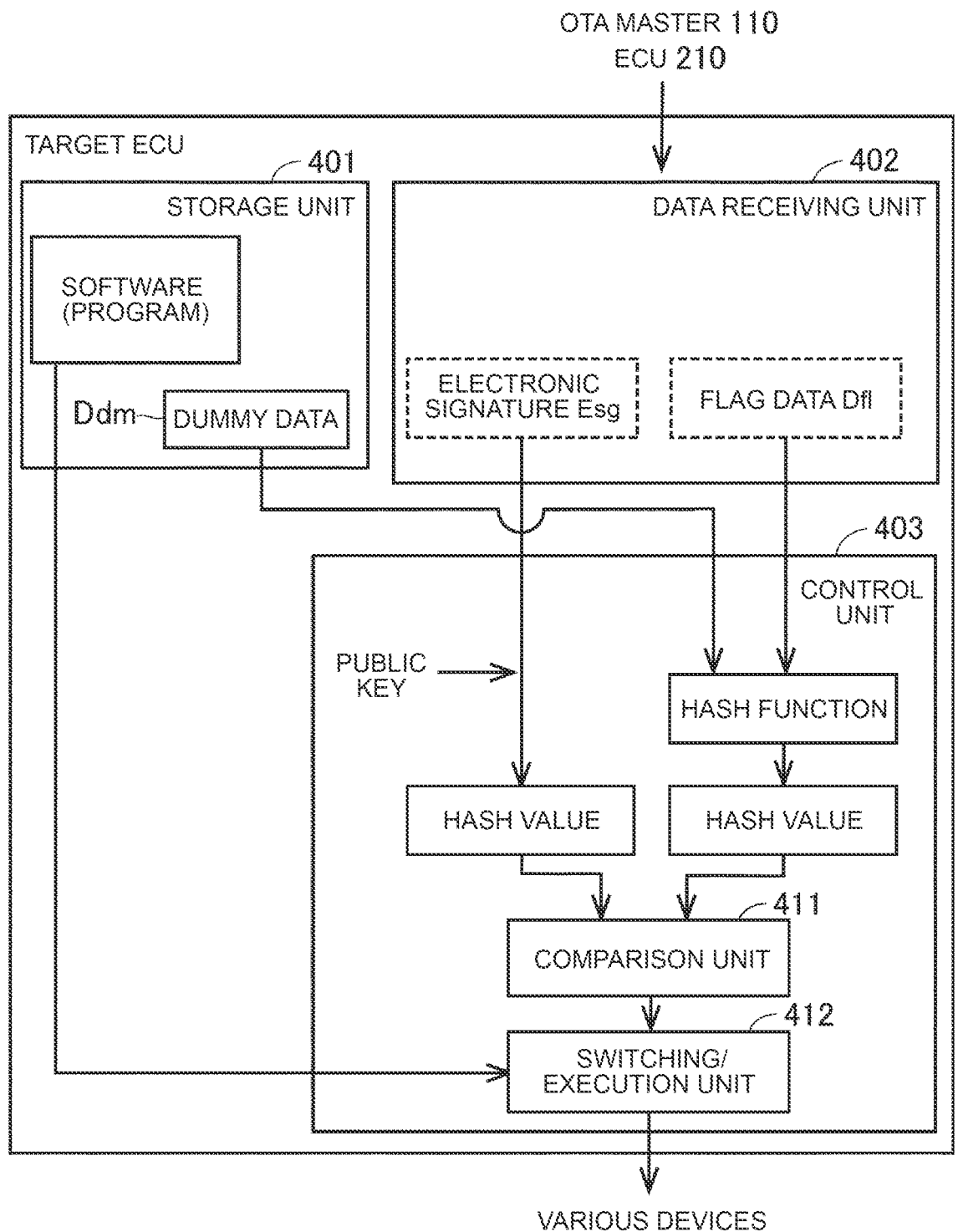
FIG. 10 illustrates a part of functional blocks constituted in a target ECU according to the second modification.

FIG. 10 illustrates a part of functional blocks constituted in a target ECU according to the second modification. The second modification is different from the above embodiment (FIG. 5) in that the dummy data Ddm are stored in the storage unit 401. The dummy data Ddm that are used to prepare an electronic signature Esg (calculate a hash value) in the flag data distribution unit 550a (FIG. 9) and the dummy data Ddm stored in the storage unit 401 may be information on the VIN of the vehicle, for example. This allows the OTA center 500 and the target ECU to share, in advance, the dummy data Ddm stored in the storage unit 551 of the flag data distribution unit 550a to be used to prepare an electronic signature Esg and the dummy data Ddm stored in the storage unit 401.

In the second modification, the control unit 403 obtains a hash value by decrypting the electronic signature Esg received by the data receiving unit 402 using a public key. The control unit 403 also calculates a hash value through a hash function calculation procedure using the flag data Dfl received by the data receiving unit 402 and the dummy data Ddm stored in the storage unit 401. The other processes are the same as those according to the above embodiment, and thus description thereof will be omitted.

In the second modification, the dummy data Ddm are not transmitted to the vehicle 100, 200. By storing the dummy data Ddm that are used to generate an electronic signature Esg in the target ECU (storage unit 401) in advance, the target ECU can read the dummy data Ddm to calculate a hash value from the flag data Dfl and the dummy data Ddm, and determine based on the hash value whether the transmitted flag data Dfl (distributed from the OTA center 500) have been tampered with.

In the above embodiment and modifications, the flag data Dfl and the electronic signature Esg are distributed from the OTA center 500 to the vehicle 100, 200. However, a server that distributes the flag data Dfl may be additionally provided, and the server may generate an electronic signature Esg and distribute the flag data Dfl, the electronic signature Esg, etc. to the vehicle 100, 200.

In the above embodiment and modifications, the target ECU of the vehicle 100, 200 verifies the authenticity of the flag data Dfl. However, the update master (OTA master 110, ECU 210) of the vehicle 100, 200 may verify the authenticity of the flag data Dfl.

The above embodiment, first modification, and second modification may be combined with each other as appropriate. For example, the second modification may be configured such that an electronic signature Esg is generated using a hash value calculated from the flag data Dfl without using the dummy data Ddm when the data length of the flag data Dfl is the predetermined length α or more.

The embodiment disclosed herein should be construed as exemplary in all respects and not restrictive. The scope of the present disclosure is indicated by the claims rather than by the description of the above embodiment, and intended to include all changes that fall within the meaning and scope equivalent to the claims.

A first aspect of the present disclosure provides a server configured to manage software for an electronic control unit (ECU) mounted on a vehicle. The server includes: a storage unit that stores flag data for switching between an activated state and a deactivated state of a specific function that is executable by the software; and a processing unit configured to generate an electronic signature to be added to the flag data. The processing unit is configured to: calculate a hash value from the flag data and dummy data that are not used to switch between the activated state and the deactivated state of the specific function; and generate the electronic signature using the calculated hash value.

When a hash value is calculated from flag data using a hash function and an electronic signature is generated using the calculated hash value, the number of patterns of the hash value is relatively small and there is an apprehension of low security strength if the data length of the flag data is short. With this configuration, the processing unit calculates a hash value from the flag data and the dummy data that are not used to switch between the activated state and the deactivated state of the specific function. The data length of data that are used to calculate a hash value is lengthened (the data amount is increased) by an amount corresponding to the dummy data and the number of patterns of the hash value that is used to generate an electronic signature is increased compared to when a hash value is calculated from the flag data, improving security strength.

In the above aspect, the server may further include a communication unit configured to communicate with the vehicle. The dummy data may be added to the flag data. The communication unit may be configured to transmit the flag data to which the dummy data are added to the ECU together with the electronic signature.

With this configuration, the dummy data are added to the flag data, and transmitted to the ECU mounted on the vehicle together with the electronic signature. The ECU mounted on the vehicle calculates a hash value using the dummy data transmitted together with the flag data, and can determine based on the hash value whether the transmitted flag data (received by the ECU) have been tampered with.

In the above aspect, the server may further include a communication unit configured to communicate with the vehicle. The communication unit may be configured to transmit the flag data to the ECU together with the electronic signature without transmitting the dummy data to the ECU.

With this configuration, the dummy data are not transmitted to the ECU mounted on the vehicle. In this case, by storing the dummy data that are used to generate an electronic signature in the ECU mounted on the vehicle in advance, the ECU can calculate a hash value by reading the dummy data, and determine based on the hash value whether the transmitted flag data (received by the ECU) have been tampered with.

In the above aspect, the processing unit may be configured to: generate the electronic signature using the hash value calculated from the flag data and the dummy data when a data length of the flag data is less than a predetermined length; and generate the electronic signature using a hash value calculated from the flag data without using the dummy data when the data length of the flag data is the predetermined length or more.

The flag data are instruction data to activate a specific function of software when the user makes a payment for the specific function, and the data length (data size) of the flag data may be 8 bytes. The dummy data may be a vehicle identification number (VIN) of the vehicle on which the ECU is mounted, identification information on the ECU, management information on the ECU (manufacturer identification number of the ECU), a product number (version) of the software (program), a fixed value, etc. The data length of the dummy data may be 8 bytes, for example. By preparing an electronic signature using the hash value from 16 bytes of data obtained by adding the flag data and the dummy data, the number of patterns of the hash value is increased compared to when a hash value is calculated from 8 bytes of flag data, improving security strength.

The flag data may include time data that indicate the time to switch between the activated state and the deactivated state of the specific function, position data that indicate the position (area) to switch between the activated state and the deactivated state of the specific function, etc., in addition to instruction data to activate the specific function when the user makes a payment for the specific function of the software. In this case, the data length of the flag data is longer than that described above, and may be 16 bytes, for example. By preparing an electronic signature using the hash value from 16 bytes of flag data, the number of patterns of the hash value is increased compared to when a hash value is calculated from 8 bytes of flag data as described above, improving security strength.

With this configuration, an electronic signature is generated using a hash value calculated from the flag data and the dummy data when the data length of the flag data is less than the predetermined length, and an electronic signature is generated using a hash value calculated from the flag data without using the dummy data when the data length of the flag data is the predetermined length or more, improving security strength.

A second aspect of the present disclosure provides a vehicle including an ECU and a communication unit configured to communicate with a server. The ECU includes a storage unit that stores software capable of executing a specific function, and a control unit configured to execute the software. The control unit is configured to calculate a hash value from flag data for switching between an activated state and a deactivated state of the specific function and dummy data that are not used to switch between the activated state and the deactivated state of the specific function when the flag data are received from the server, and switch between the activated state and the deactivated state of the specific function when it is determined based on the calculated hash value that the flag data have not been tampered with.

With this configuration, the control unit calculates a hash value from the flag data and the dummy data that are not used to switch between the activated state and the deactivated state of the specific function, and switches between the activated state and the deactivated state of the specific function when it is determined based on the calculated hash value that the flag data have not been tampered with. Consequently, the data length is lengthened (the data amount is increased) by an amount corresponding to the dummy data and the number of patterns of the hash value is increased compared to when a hash value is calculated from the flag data, improving security strength.

In the above aspect, the dummy data may be stored in the storage unit in advance.

In the above aspect, the control unit may receive the dummy data together with the flag data.

A third aspect of the present disclosure provides a software management method of managing an ECU mounted on a vehicle. The software management method includes: calculating a hash value from flag data for switching between an activated state and a deactivated state of a specific function that is executable by software and dummy data that are not used to switch between the activated state and the deactivated state of the specific function; preparing an electronic signature using the calculated hash value; transmitting the flag data and the electronic signature to the vehicle; comparing the hash value calculated from the flag data and the dummy data received by the vehicle and the hash value of the electronic signature received by the vehicle to determine whether the flag data received by the vehicle have been tampered with; and switching between the activated state and the deactivated state of the specific function on condition that the flag data received by the vehicle have not been tampered with.

With this method, a hash value is calculated from the flag data for switching between the activated state and the deactivated state of the specific function that is executable by software and the dummy data that are not used to switch between the activated state and the deactivated state of the specific function, and an electronic signature is prepared using the calculated hash value. The prepared electronic signature is transmitted to the vehicle together with the flag data. A hash value is calculated from the dummy data and the flag data received by the vehicle, and compared with a hash value of the electronic signature received by the vehicle. When the hash value calculated from the flag data and the dummy data and the hash value of the electronic signature coincide with each other, for example, it is determined that the flag data received by the vehicle have not been tampered with, and switching between the activated state and the deactivated state of the specific function is made. Thus, the data length of data that are used to calculate a hash value is lengthened (the data size is increased) by an amount corresponding to the dummy data and the number of patterns of the hash value is increased compared to when a hash value is calculated from the flag data, improving security strength.

In the above aspect, the dummy data may be transmitted to the vehicle together with the flag data and the electronic signature.

In the above aspect, the dummy data may be stored in the ECU in advance.

What is claimed is:

1. A server configured to manage software for an electronic control unit (ECU) mounted on a vehicle, the server comprising:
    one or more memories that store flag data for switching between an activated state and a deactivated state of a specific function that is executable by the software; and
    one or more processors configured to generate an electronic signature to be added to the flag data, wherein the one or more processors are configured to
        calculate a hash value from the flag data and dummy data, the dummy data not being used to switch between the activated state and the deactivated state of the specific function, and
        generate the electronic signature using the hash value.

2. The server according to claim 1, wherein:
    the one or more processors are further configured to communicate with the vehicle;
    the dummy data are added to the flag data; and
    the one or more processors are configured to transmit the flag data, to which the dummy data are added, to the ECU together with the electronic signature.

3. The server according to claim 1, wherein the one or more processors are further configured to:
    communicate with the vehicle;
    not transmit the dummy data to the ECU, and
    transmit the flag data to the ECU together with the electronic signature.

4. The server according to claim 1, wherein the one or more processors are configured to generate the electronic signature using the hash value calculated from the flag data and the dummy data when a data length of the flag data is less than a predetermined length, and generate the electronic signature using a hash value calculated from the flag data without using the dummy data when the data length of the flag data is equal to or greater than the predetermined length.

5. A vehicle comprising:

an electronic control unit (ECU); and a communication module configured to communicate with a server, wherein:

the ECU includes one or more memories that store software capable of executing a specific function, and one or more processors configured to execute the software; and the one or more processors are configured to calculate a hash value from flag data for switching between an activated state and a deactivated state of the specific function and dummy data, the dummy data not being used to switch between the activated state and the deactivated state of the specific function when the flag data are received from the server, and switch between the activated state and the deactivated state of the specific function when it is determined based on the hash value that the flag data have not been tampered with.

6. The vehicle according to claim 5, wherein the dummy data are stored in the one or more memories in advance.

7. The vehicle according to claim 5, wherein the one or more processors are configured to receive the dummy data together with the flag data.

8. A software management method of managing an electronic control unit (ECU) mounted on a vehicle, the software management method comprising:

calculating a hash value from flag data for switching between an activated state and a deactivated state of a specific function that is executable by software and dummy data, the dummy data not being used to switch between the activated state and the deactivated state of the specific function;

preparing an electronic signature using the hash value;

transmitting the flag data and the electronic signature to the vehicle;

comparing the hash value calculated from the flag data and the dummy data received by the vehicle and the hash value of the electronic signature received by the vehicle to determine whether the flag data received by the vehicle have been tampered with; and switching between the activated state and the deactivated state of the specific function on condition that the flag data received by the vehicle have not been tampered with.

9. The software management method according to claim 8, wherein the dummy data are transmitted to the vehicle together with the flag data and the electronic signature.

10. The software management method according to claim 8, wherein the dummy data are stored in the ECU in advance.

* * * * *